United States Patent
Hande et al.

(10) Patent No.: US 8,516,493 B2
(45) Date of Patent: Aug. 20, 2013

(54) SYSTEM AND METHOD FOR MASSIVELY MULTI-CORE COMPUTING SYSTEMS

(75) Inventors: Nitin Hande, Santa Clara, CA (US); Hua Ji, Cupertino, CA (US); Kais Belgaied, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 299 days.

(21) Appl. No.: 13/019,303

(22) Filed: Feb. 1, 2011

(65) Prior Publication Data

US 2012/0198465 A1 Aug. 2, 2012

(51) Int. Cl.
*G06F 9/46* (2006.01)
*G06F 15/173* (2006.01)

(52) U.S. Cl.
USPC ........... 718/105; 718/104; 709/223; 709/224; 709/225; 709/226

(58) Field of Classification Search
None
See application file for complete search history.

(56) References Cited

U.S. PATENT DOCUMENTS

| | | | |
|---|---|---|---|
| 7,054,943 B1 * | 5/2006 | Goldszmidt et al. | 709/229 |
| 7,337,226 B2 * | 2/2008 | Saha et al. | 709/226 |
| 7,356,602 B2 * | 4/2008 | Goldszmidt et al. | 709/229 |
| 7,590,739 B2 * | 9/2009 | Swildens et al. | 709/226 |
| 7,640,547 B2 * | 12/2009 | Neiman et al. | 718/104 |
| 7,703,102 B1 * | 4/2010 | Eppstein et al. | 718/104 |
| 7,756,989 B2 * | 7/2010 | Goldszmidt et al. | 709/229 |
| 8,140,655 B1 * | 3/2012 | Schantz et al. | 709/223 |
| 2003/0093528 A1 * | 5/2003 | Rolia | 709/226 |
| 2004/0181476 A1 * | 9/2004 | Smith et al. | 705/35 |
| 2005/0149940 A1 * | 7/2005 | Calinescu et al. | 718/104 |
| 2005/0256946 A1 * | 11/2005 | Childress et al. | 709/223 |
| 2008/0155100 A1 * | 6/2008 | Ahmed et al. | 709/226 |
| 2010/0107172 A1 * | 4/2010 | Calinescu et al. | 718/104 |
| 2011/0093596 A1 * | 4/2011 | Zimmet et al. | 709/226 |
| 2011/0213885 A1 * | 9/2011 | Kelkar et al. | 709/226 |
| 2012/0096468 A1 * | 4/2012 | Chakravorty et al. | 718/103 |

OTHER PUBLICATIONS

Apple, "Grand Central Dispatch; A better way to do Multicore," Technology Brief, Aug. 2009, 6 pages.
Baumann, A., et al., "The Multikernel: A new OS architecture for scalable multicore systems," SOSP, Oct. 11-14, 2009, 15 pages.

(Continued)

*Primary Examiner* — Emerson Puente
*Assistant Examiner* — Adam Lee
(74) *Attorney, Agent, or Firm* — Slater & Matsil, L.L.P.

(57) ABSTRACT

A system and method for massively multi-core computing are provided. A method for computer management includes determining if there is a need to allocate at least one first resource to a first plane. If there is a need to allocate at least one first resource, the at least one first resource is selected from a resource pool based on a set of rules and allocated to the first plane. If there is not a need to allocate at least one first resource, it is determined if there is a need to de-allocate at least one second resource from a second plane. If there is a need to de-allocate at least one second resource, the at least one second resource is de-allocated. The first plane includes a control plane and/or a data plane and the second plane includes the control plane and/or the data plane. The resources are unchanged if there is not a need to allocate at least one first resource and if there is not a need to de-allocate at least one second resource.

23 Claims, 9 Drawing Sheets

(56) References Cited

OTHER PUBLICATIONS

Engler, D. R., et al., "Exokernel: An Operating System Architecture for Application-Level Resource Management," Association for Computing Machinery, Inc., Dec. 1995, 16 pages.

Liu, R., et al., "Tessellation: Space-Time Partitioning in a Manycore Client OS," Mar. 2009, 6 pages.

Nishtala, R., et al., "Optimizing Collective Communication on Multicores," 2009, 6 pages.

Schupbach, A., et al., "Embracing diversity in the Barrelfish manycore operating system," MMCS, Jun. 24, 2008, 9 pages.

Shah, A., et al., "Multicore Chips Pose Next Big Challenge for Indusry," PC World, Mar. 20, 2009, 4 pages.

Singh, A., "An Introduction to Virtualization," kernelthread.com, Jan. 2004, 23 pages.

* cited by examiner

SYSTEM AND METHOD FOR MASSIVELY MULTI-CORE COMPUTING SYSTEMS

TECHNICAL FIELD

The present invention relates generally to digital computing, and more particularly to a system and method for massively multi-core computing systems.

BACKGROUND

Generally, multi-core computing is a way to potentially improve computing performance without having to continually increase the processing power, operating frequency, processing technology, and so forth, of individual processing cores. A processing core may also be commonly and interchangeably referred to as a processing core, a core, a processor, a central processing unit, and so on.

As an example, increasing the number of processing cores in a computer from one processing core to two processing cores may effectively double an overall processing power of the computer, which may be substantially equal to the increase in processing power gained by doubling the operating frequency of a single processing core, advancing the processing technology, and so on. However, doubling the operating frequency, advancing the processing technology, and so forth, to double the computing power of a single processing core may be significantly more difficult to achieve than using two processing cores.

Typically, massively multi-core computers may be defined as a computer with a large number of processing cores, potentially on the order of hundreds, thousands, and so on, of processing cores. Although the large number of processing cores promises significant increases in processing power, existing operating system design may suffer from considerable performance degradation and may fail to take full advantage of all of the processing cores in a massively multi-core computer. Furthermore, hardware design, such as memory and cache hierarchies, memory and cache placement policies, interconnects, instruction sets and IO configurations, may exhibit a diverse array of tradeoffs.

Several operating paradigms exist for massively multi-core computing systems, including asymmetric multi-core processing (AMP), symmetric multi-core processing (SMP), and virtualization based processing. In AMP, processing cores are assigned specific responsibilities and operate independently of each other. Memory for the processing cores may be partitioned and each processing core has access to parts of the memory, executing its own instance of an operating system. In AMP, processing load needs to be statically partitioned a priori. Similarly, partitioning of the processing cores and assignment of the operating system is also performed statically. An advantage of AMP is that it is both scalable and fault tolerant since any number of processing cores may be statically partitioned and a new operating system may be assigned to the processing cores. Furthermore, a fault in a processing core does not impact other processing cores. However, static partitioning may be very difficult especially in massively multi-core computing systems (attendant with multi-fold increase in scale) and subsequently debugging of such a computing system is very challenging (for example, due to the state of the computing system being spread out across multiple operating system images and in order to get an accurate picture of the a particular sub-system one is never sure of which operating system images should be examined for debugging and analysis purposes).

In SMP, all the processing cores of a massively multi-core computing system are under the control of a single operating system, therefore, there is inherent complexity when the number of processing cores increases dramatically. In order to deal with the complexity of a massively multi-core computing system, many solutions have been proposed. Programming complexity has been shifted to application developers in some solutions, while in others the complexity is hidden in the operating system software and hidden from application developers. In yet other solutions, the complexity is shifted into a communication space wherein the processing cores exchange continuous messages to maintain a coherent view of the memory, cache, and semantics of operations distributed over multiple processing cores. In the different solutions proposed for SMP, the operating system needs to have optimal knowledge of thread placement, memory placement, and possibly non-uniform memory architecture (NUMA) issues surrounding SMP.

In virtualization based processing, a hypervisor performs the partitioning of resources of a massively multi-core computing system. Virtualization based processing retains the flexibility of executing different operating systems on different processing cores. Variants of virtualization based processing allow for an offloading of resource management aspects to userland processes, micro-kernels, and so on.

SUMMARY OF THE INVENTION

These and other problems are generally solved or circumvented, and technical advantages are generally achieved, by example embodiments of the present invention which provide a system and method for massively multi-core computing.

In accordance with an example embodiment of the present invention, a method for computer management is provided. The method includes: determining if there is a need to allocate at least one first resource to a first plane; and if there is a need to allocate at least one first resource, selecting the at least one first resource from a resource pool based on a set of rules, and allocating the at least one resource to the first plane. The method further includes: if there is not a need to allocate at least one first resource, determining if there is a need to de-allocate at least one second resource from a second plane, and if there is a need to de-allocate at least one second resource, de-allocating the at least one second resource. The first plane includes a control plane, a data plane, or a combination thereof, the second plane includes the control plane, the data plane, or a combination thereof, and resources are unchanged if there is not a need to allocate at least one first resource and if there is not a need to de-allocate at least one second resource.

In accordance with another example embodiment of the present invention, a computing system is provided. The computing system includes: a data plane; a control plane coupled to the data plane; a common resource pool coupled to the data plane and to the control plane; and a management plane coupled to the data plane and to the control plane. The data plane moves data, the control plane executes applications to manipulate data in the data plane, and the common resource pool contains unallocated resources of the computing system. The management plane allocates resources from the common resource pool to the data plane or the control plane, and de-allocates resources from the data plane or the control plane to the common resource pool. The allocation and the de-allocation are based on load balancing rules.

In accordance with another example embodiment of the present invention, a management plane of a computing system is provided. The management plane includes: a load balance unit; a provisioning unit coupled to the load balance unit; and a policy unit coupled to the provisioning unit. The load balance unit determines a load of the computing system, and the provisioning unit selects at least one resource to a first plane based on the load and a set of rules, and allocates the at least one resource to a first plane based on the load, wherein the at least one resource is selected from a common resource pool. The policy unit defines the set of rules.

One advantage disclosed herein is that a scalable, portable, elastic, and high performance system and method for managing a massively multi-core computing system is presented. The system and method provides an elastic and high performance computing system for a wide range of architectures, from a multi-core computing system with a small number of processing cores to a computing system with a large number of processing cores, without incurring significant modification and/or adjustment costs.

A further advantage of exemplary embodiments is that the system and method for managing the massively multi-core computing system provides power management to adjust power consumption of the massively multi-core computing system based on computational requirements. For example, at times when computational requirements are low and some computing components, such as processing cores, memories, specially designed circuitry, and so on, may be idle; the idle computing components may be placed in a sleep or low power mode to reduce power consumption.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
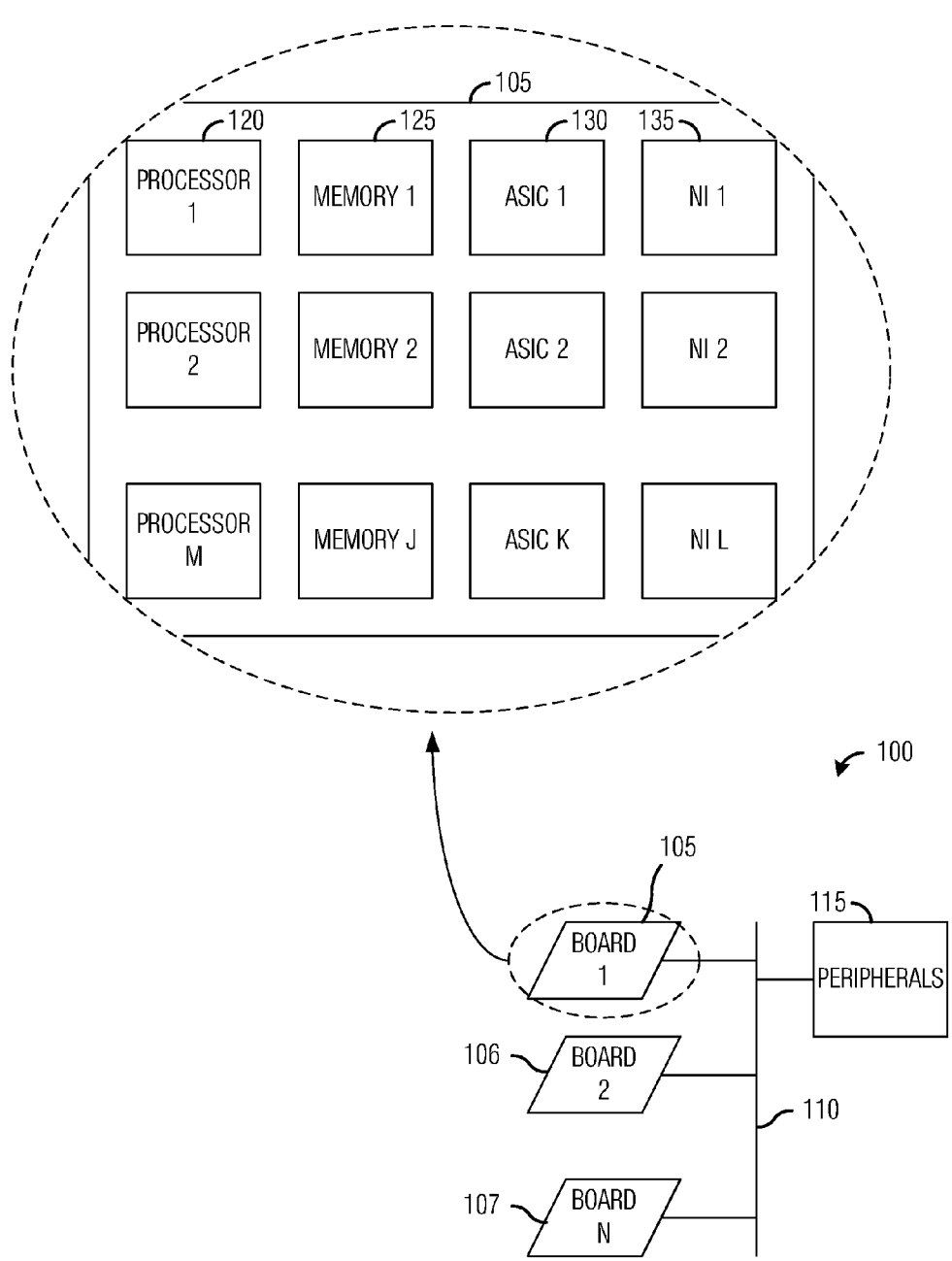
FIG. 1 illustrates an example a massively multi-core computing system.

The making and using of the presently example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a massively multi-core computing system used as a communications network processing device. The invention may also be applied, however, to other massively multi-core computing systems used in dedicated applications.

Externally, network equipment may appear to be a monolithic entity. However, due to increased complexity of communications protocols and features, as well as a need to interwork with multiple communications protocols, a move may be afoot towards massively multi-core computing systems to implement network infrastructure functionality. Along with the move to massively multi-core computing systems, there arises a need to efficiently manage and operate the said systems.

Functionally, network equipment consists of many internal logical elements, and there are challenges to manage the network elements in an organized and cohesive manner. The challenges include:

Scalability: In the past, there was a tendency to use processing cores with higher clock frequencies, larger memories and caches, and generally, more processing power. The focus was to extract maximum performance out of a single processing stream. However, as single processing core processing bounds are approached, the focus has turned to multiple processing core systems. The move towards multiple processing core systems has been accelerated as newer manufacturing processes allow the fabrication of more devices (e.g., transistors) on a single semiconductor die. In order to maximize the performance inherent in computing systems with multiple processing cores architecture scalability may be of paramount importance in system software. The complexity that comes with a massively multi-core architecture places great emphasis on the scalability of the processing cores for optimal operation;

Elasticity of Resources: Performance is a very important criterion in a massively multi-core computing system. Therefore, there is a need to have elasticity in terms of available resources to processing a potentially varying workload in order to maximize performance. Another requirement is a desire to obtain optimal power utilization in a massively multi-core computing system. On the surface, the two requirements (elasticity and optimal power utilization) may appear to be contradictory. However, with a properly designed solution, both elasticity and optimal power utilization may be achieved;

Performance: Normally, performance should be maximized to a maximum extent;

Portability: In general, a networking application may be executed on a wide range of computing platforms. A challenge is to develop applications on one computing platform and then move the applications to another platform requiring few (or even no) modifications. A foundation on which the applications are developed should have enough abstractions to enable the development of portable applications; and Debug and Tracing: Developing applications, such as networking applications, for massively multi-core computing systems may be difficult and error prone. Therefore, an ability to debug and trace (also referred to as debug-ability) applications may be crucial to the success of the massively multi-core computing system. Debug-ability is not simply restricted to analyzing software faults and/or errors, but also necessary to understand an impact of other processing cores and software executing on the other processing cores on the performance of the massively multi-core computing system.

Given the above challenges, a problem may be how to utilize and maximize the performance gain achievable from a massively multi-core computing system. An objective of the present invention is to provide a system and method to effectively and simply manage a massively multi-core computing system. The system and method are scalable, portable, elastic, have high performance and be good in terms of effective power management.

FIG. 1 illustrates a massively multi-core computing system 100. Massively multi-core computing system 100 includes one or more computing boards, such as board 1 105, board 2 106, and board N 107. The computing boards may be connected together over an interconnection network 110, such as a communications bus, a serial connection, a broadcast network, or so forth. Massively multi-core computing system 100 may also include peripherals 115, which may include storage, displays, terminals, input/output devices, communications interfaces, and so on. Examples of storage may include volatile and non-volatile memory, as well as disk drives (e.g., caches, magnetic memory, solid state memory, network storage, and etc.). Typically, massively multi-core computing system 100 may further include a capability for adding and/or removing computing boards as computational requirements change.

Also shown in FIG. 1 is a detailed view of an exemplary embodiment of board 1 105. Board 1 105 may include one or more processing cores, such as processor 1 120. Although shown as separate and distinct processing cores, the processing cores may be implemented as multi-core semiconductor die, wherein a single semiconductor die comprises a plurality of processing cores. Board 1 105 may further include one or more memories, such as memory 1 125. A memory may include caches (potentially multiple levels of cache memory), solid state memory, magnetic memory, network storage, and so forth. The memories may be arranged logically as a single memory, multiple memories, or a combination thereof.

Board 1 105 may also include application specific integrated circuits (ASIC), such as ASIC 1 130. An ASIC may be a custom designed integrated circuit that is specifically created to implement a technique or procedure instead of being implemented as a software module to be executed in a processing core. In addition to ASICs, board 1 105 may also include field-programmable logic arrays, or other forms of complied hardware circuits. Board 1 105 may also include one or more network interfaces (NI), such as NI 1 135. A network interface may be used to communicate with other processing cores, peripherals, and so forth, not located on a single computing board.

In addition to processing cores, memories, ASICs, and NIs, board 1 105 may include other elements that may be important for operation, but are not shown to maintain simplicity of FIG. 1, such as a communications interconnections (e.g., a communications bus, a serial connection, a network, or so on), as well as components such as capacitors, inductors, resistors, and so on, that may be used to ensure proper operation of the computer board.

Massively multi-core computing system 100 illustrates an exemplary embodiment of a massively multi-core computing system. Many different designs exist for massively multi-core computing systems, therefore, the illustration of an exemplary embodiment wherein computer boards with at least one processing core per board communicate with one another as well as with peripherals over a communications network should not be construed as being limiting to either the scope or spirit of the embodiments.

Figure 2:
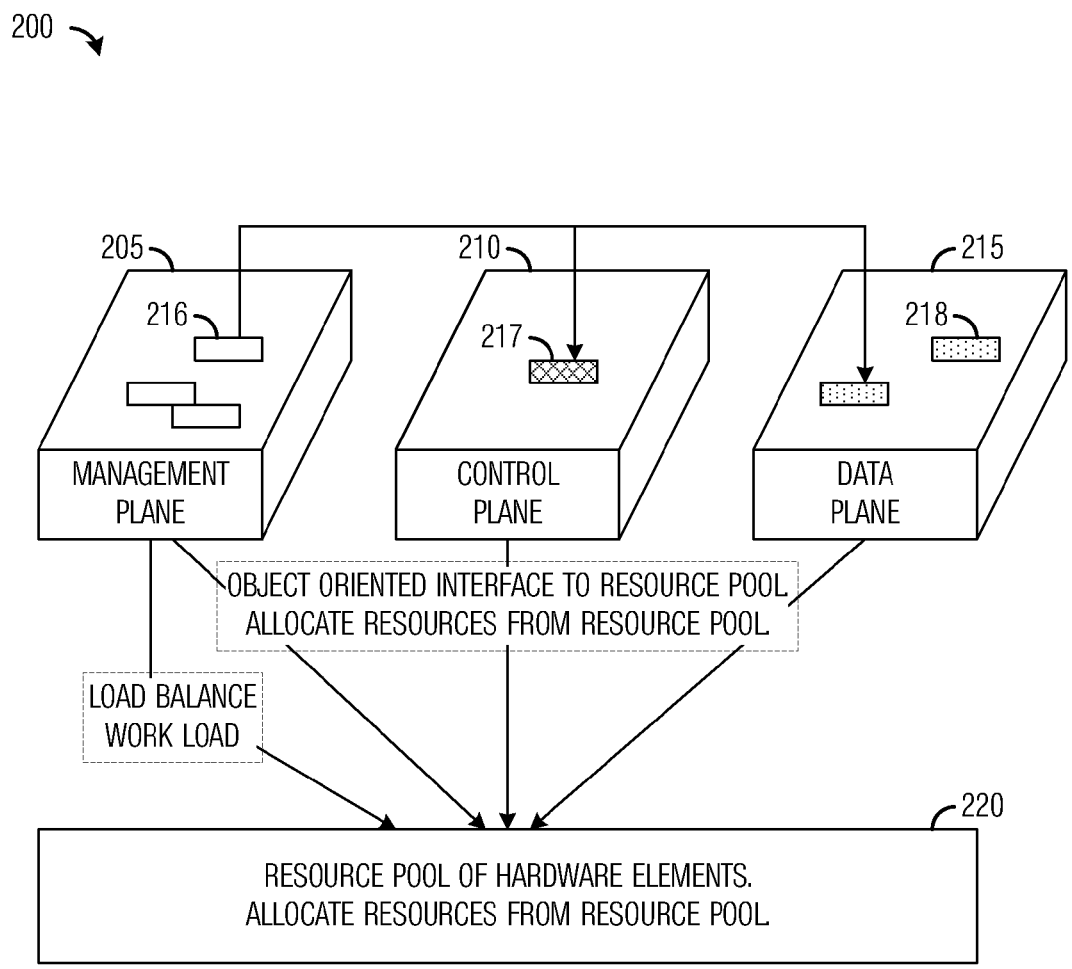
FIG. 2 illustrates an example of a logical architecture of a massively multi-core computing system according to example embodiments described herein.

FIG. 2 illustrates a logical architecture 200 of a massively multi-core computing system. Above a physical architecture of a massively multi-core computing system, there may be a logical architecture that may have a very different appearance. In general, a logical architecture may be independent of a physical architecture and a logical architecture may be implemented on a wide range of physical architectures.

Logical architecture 200 provides a SMP approach to massively multi-core computing and may be partitioned into three operational planes: a management plane 205, a control plane 210, and a data plane 215. Management plane 205 may be used to allocate and/or de-allocate resources of the massively multi-core computing system to control plane 210 and/or data plane 215. Allocation and/or de-allocation of the resources of the massively multi-core computing system may be performed based on load balancing rules, which may help to control the allocation and/or de-allocation of the resources to as evenly distribute the load as possible while helping to optimize performance. For example, management plane 205 may allocate and/or de-allocate resources to balance a work load across the resources of the massively multi-core computing system while optimizing performance parameters, such as minimizing communications latency, maximizing data throughput, grouping resources for a single process as closely together as possible, and so on.

As shown in FIG. 2, objects may be allocated and/or de-allocated to and/or from control plane 210 and/or data plane 215 by management plane 205. In FIG. 2, unshaded rectangular boxes (such as box 216) are representative of unallocated resources, crosshatched rectangular boxes (such as box 217) are representative of resources allocated to control plane 210, and dotted rectangular boxes (such as box 218) are representative of resources allocated to data plane 215.

Control plane 210 may be responsible for execution of applications (e.g., instructions) for manipulating data in data plane 215. As an example, consider a situation wherein the massively multi-core computing system is being used as a network entity that routes and transports messages between various communications devices in a communications network. In such a situation, control plane 210 may be responsible for implementing communications protocols, processing message headers, creating routes for messages between message source and message destination, data encoding and decoding, interleaving and de-interleaving, error encoding and detecting, hybrid automatic response requested operation, and so on; while data plane 215 may be responsible for moving data between ingress and egress, for example, message content between communications devices.

Computational resources of the massively multi-core computing system may be placed in a common resource pool 220. For example, referencing massively multi-core computing system 100 of FIG. 1, the various resources corresponding to the processing cores, the memories, the ASICs, the NIs, and so forth, may be placed in common resource pool 220.

According to an example embodiment, the processes that execute in the three operational planes have object-oriented interfaces, as does common resource pool 220. The object-oriented interface allows for interaction that deals explicitly with object representations of entities. Generally, with an object-oriented interface, the operational planes may perceive and act on objects, objects may be classified based on their behavior, and in a context of what is being performed, objects may fit together into a coherent representation.

As an example, resources of the massively multi-core computing system and a set of methods for accessing and managing the resources may be referred to as objects. The objects may wrap the resources with a set of functions that are designed to ensure that the resources are used appropriately and to assist in the usage of the resources. The methods of an object usually include checks and safeguards that are specific to the resources contained in the data. In other words, each object may be viewed as an independent entity; therefore, a natural candidate for SMP. The use of object-oriented interfaces may help in the portability of logical architecture 200 over different physical architectures.

Figure 3A:
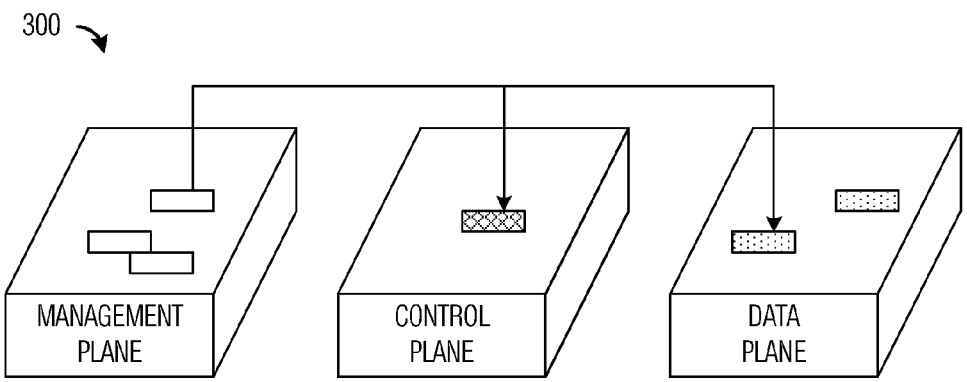
FIG. 3a illustrates an example of a logical architecture for a massively multi-core computing system, wherein logical architecture comprises one management plane according to example embodiments described herein.

FIG. 3*a* illustrates a logical architecture 300 for a massively multi-core computing system, wherein logical architecture 300 comprises one management plane. As shown in FIG. 3*a*, a management plane is responsible for allocating and/or de-allocating resources of the massively multi-core computing system for a control plane and a data plane. According to an example embodiment, the resources of the massively multi-core computing system may be controlled by the management plane.

Figure 3B:
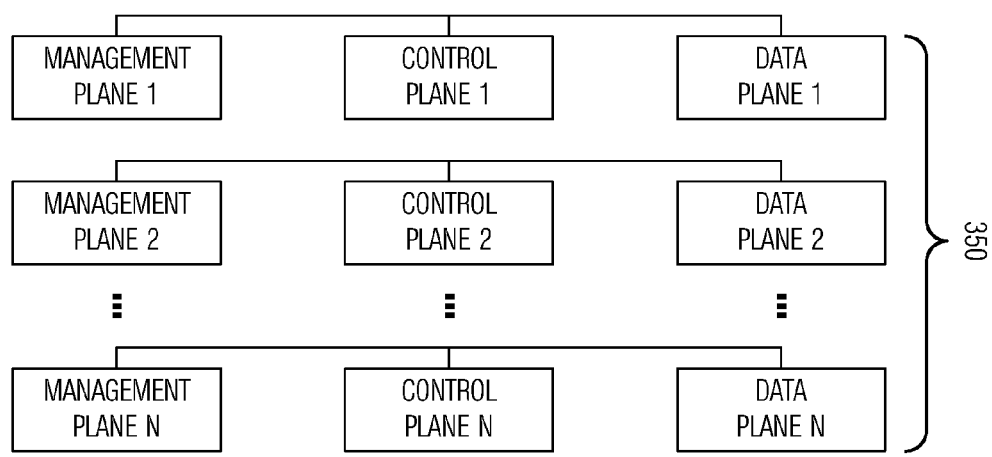
FIG. 3b illustrates an example of a logical architecture for a massively multi-core computing system, wherein logical architecture comprises multiple management planes according to example embodiments described herein.

FIG. 3*b* illustrates a logical architecture 350 for a massively multi-core computing system, wherein logical architecture 350 comprises multiple management planes. As shown in FIG. 3*b*, N management planes are responsible for allocating and/or de-allocating resources of the massively multi-core computing system for N control planes and N data planes, where N is an integer value greater than or equal to one.

According to an example embodiment, in a massively multi-core computing system with N management planes, a subset of the N management planes may be active while a remainder of the management planes may be in a sleep or standby mode.

According to an example embodiment, the resources of the massively multi-core computing system may be partitioned into N parts (with each part being its own resource pool) and each of the N management planes may be responsible for one of the N parts. The resources in each part may be disjoint, meaning that the resources of one part do not interact with resources of the remaining parts.

According to an embodiment, the resources of the massively multi-core computing system may be partitioned into fewer than N parts (with each part being its own resource pool). Therefore, at least two of the management planes may share allocation and/or de-allocation duties for one part of resources.

According to an embodiment, each of the N management planes may execute on a separate management resource or a separate set of management resources. By executing on separate resources, interaction between management planes may be reduced, as well as reducing processing overhead that may occur if multiple management planes are executing on the same resource(s). Furthermore, executing on separate resources may allow for the management plane to be executing on resources that are located close to the resources that they are managing, thereby potentially reducing latency overhead.

Figure 4:
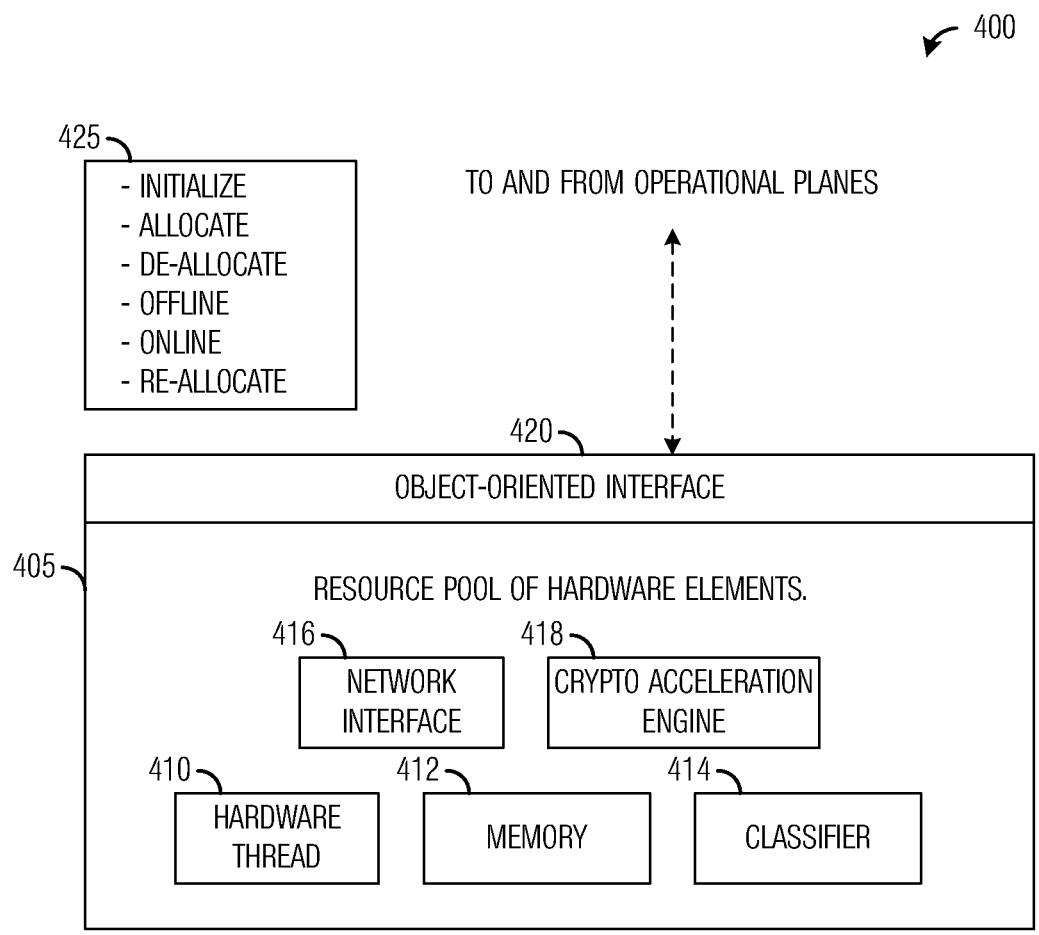
FIG. 4 illustrates an example of a resource pool object according to example embodiments described herein.

FIG. 4 illustrates a resource pool object 400. According to an example embodiment, resource pool object 400 for a massively multi-core computing system used as a network entity comprises several processing elements (a processing element is a generic term used to refer to hardware and/or software elements in the massively multi-core computing system). In some situations, a processing element may possess intelligence and may be programmed to make decisions, such as a classifier (e.g., a packet classifier). While in other situations, the processing element may be a simple data store, such as a memory.

Combined together, the processing elements participate in decision making over network traffic. The processing elements collectively form a common resource pool 405 for the massively multi-core computing system. Actual processing elements in common resource pool 405 may depend on signaling and/or communications protocols to be implemented. Examples of processing elements in common resource pool 405 may include:

Hardware Thread 410 include hardware work threads that are bound to strands of the processing cores;

Memory 412 includes cache memory, volatile and non-volatile memory, and so forth;

Classifier 414 may be a packet classifier implemented either in hardware and/or software components;

Network Interface 416 may be a network interface board with descriptors, buffers, and control hardware and/or software to make use of same; and Crypto Acceleration Engine 418 may be an encryption and/or decryption module implemented either in hardware and/or software to implement encryption and/or decryption used in communications.

A management plane may be free to allocate and/or de-allocate processing elements in common resource pool 405. The management plane may use an object-oriented interface 420 to common resource pool 405 to manage, which includes allocating and/or de-allocating, resources in common resource pool 405. Examples of commands that the management plane may be able to utilize to manage the processing elements in common resource pool 425 are shown in box 425 and may include:

Initialize—initialize one or more processing elements;

Allocate—allocate one or more processing elements;

De-Allocate—de-allocate one or more processing elements;

Offline—put one or more processing elements offline, i.e., put the one or more processing in to sleep or low power mode;

Online—bring one or more processing elements online, i.e., make the one or more processing elements available for use; and Re-Allocate—re-allocate one or more processing elements.

The management plane may be able to allocate processing elements from common resource pool 405 and deploy it dynamically to tasks using an Allocate command. The management plane may also reclaim allocated processing elements and re-deploy them for different purposes with a Re-Allocate command or a combination of De-Allocate and Allocate commands.

The management plane may have additional capabilities including:

An ability to assemble processing elements in common resource pool (e.g., the Initialize command);

An ability to allocate and/or purge processing elements for different purposes during operation (e.g., the De-Allocate and Re-Allocate commands); and An ability to take processing elements offline for dynamic reconfiguration and/or power management operation (e.g., the Offline and Online commands).

Figure 5:
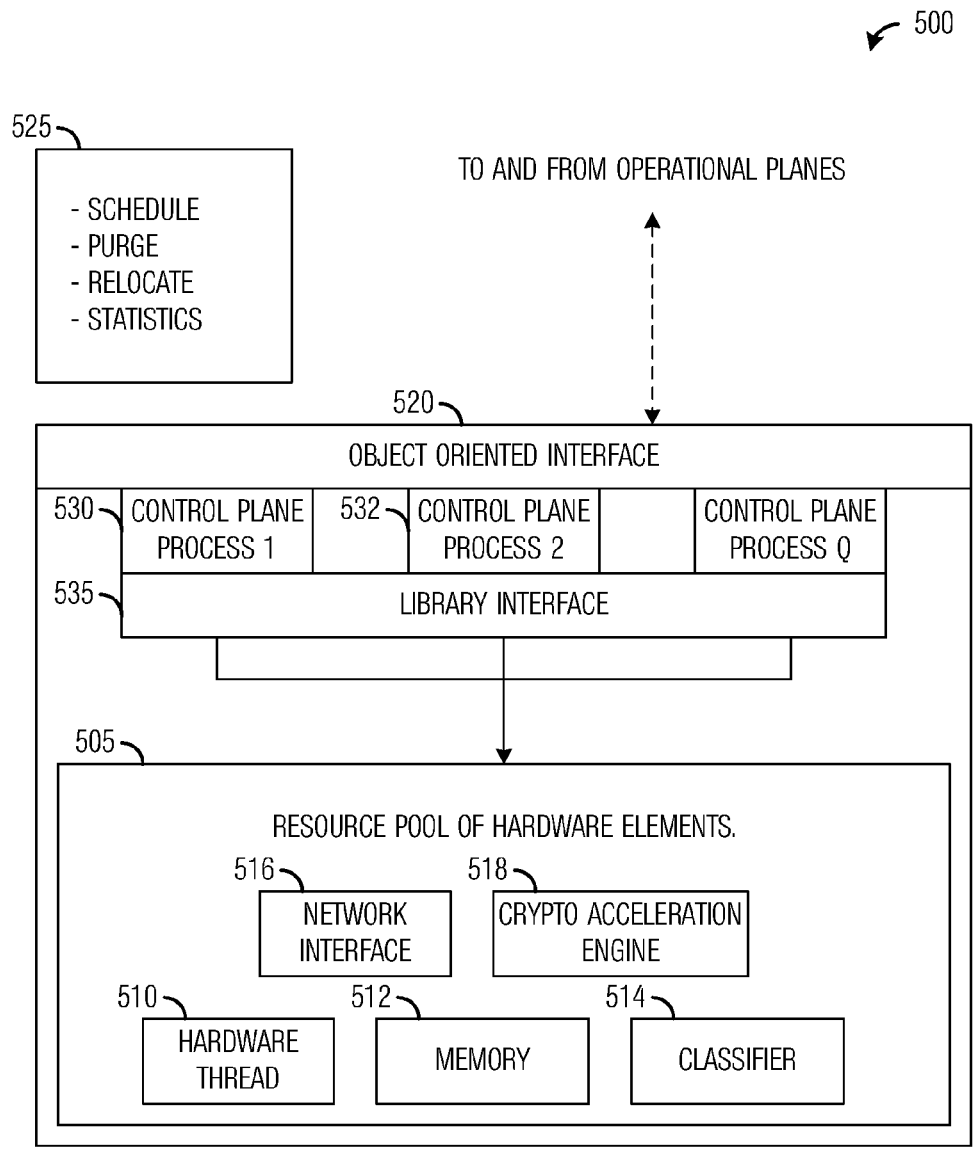
FIG. 5 illustrates an example of a control plane object according to example embodiments described herein.

FIG. 5 illustrates a control plane object 500. According to an example embodiment, control plane object 500 for a massively multi-core computing system used as a network entity may be used to execute signaling and/or routing protocols for a communications network. Control plane object 500 comprises necessary control processes, library interfaces, and resources including hardware virtual thread, memory, network interface, and appropriate classifier entities.

Processing elements in a common resource pool 505 may be allocated to control plane object 500 for use in a control plane of the massively multi-core computing system. Examples of processing elements in common resource pool 505 include, but are not limited to: hardware thread 510, memory 512, classifier 514, network interface 516, and crypto acceleration engine 518. According to an example embodiment, a nature of a task being performed in control plane object 500 may dictate which processing element(s) are assigned to control plane object 500.

A management plane may be able to manage control plane object 500 through an object oriented interface 520. Exemplary commands that the management plane may be able to utilize to manage control plane object 500 are shown in box 525 and may include:

Schedule—schedule a start of control plane object 500, includes a specification of processing elements assigned to control plane object 500;

Purge—end allocation of control plane object 500;

Relocate—change allocation of processing elements of an existing control plane object, useful in load balancing operations; and Statistics—obtain statistics, including usage time, idle time, load, information related to task(s) assigned to control plane object 500, as well as performance related information.

As shown in FIG. 5, control plane object 500 includes a number of control plane processes, such as control plane process 1 530, and control plane process 2 532. Control plane processes may be assigned for execution on processing elements from common resource pool 505, and may access the processing elements through a library interface 535. Library interface 535 may include interface routines, procedures, and so on, to support usage of processing elements. Examples of interface routines, procedures, and so forth, in library interface 535 may include device drivers, interface software, etc.

Figure 6:
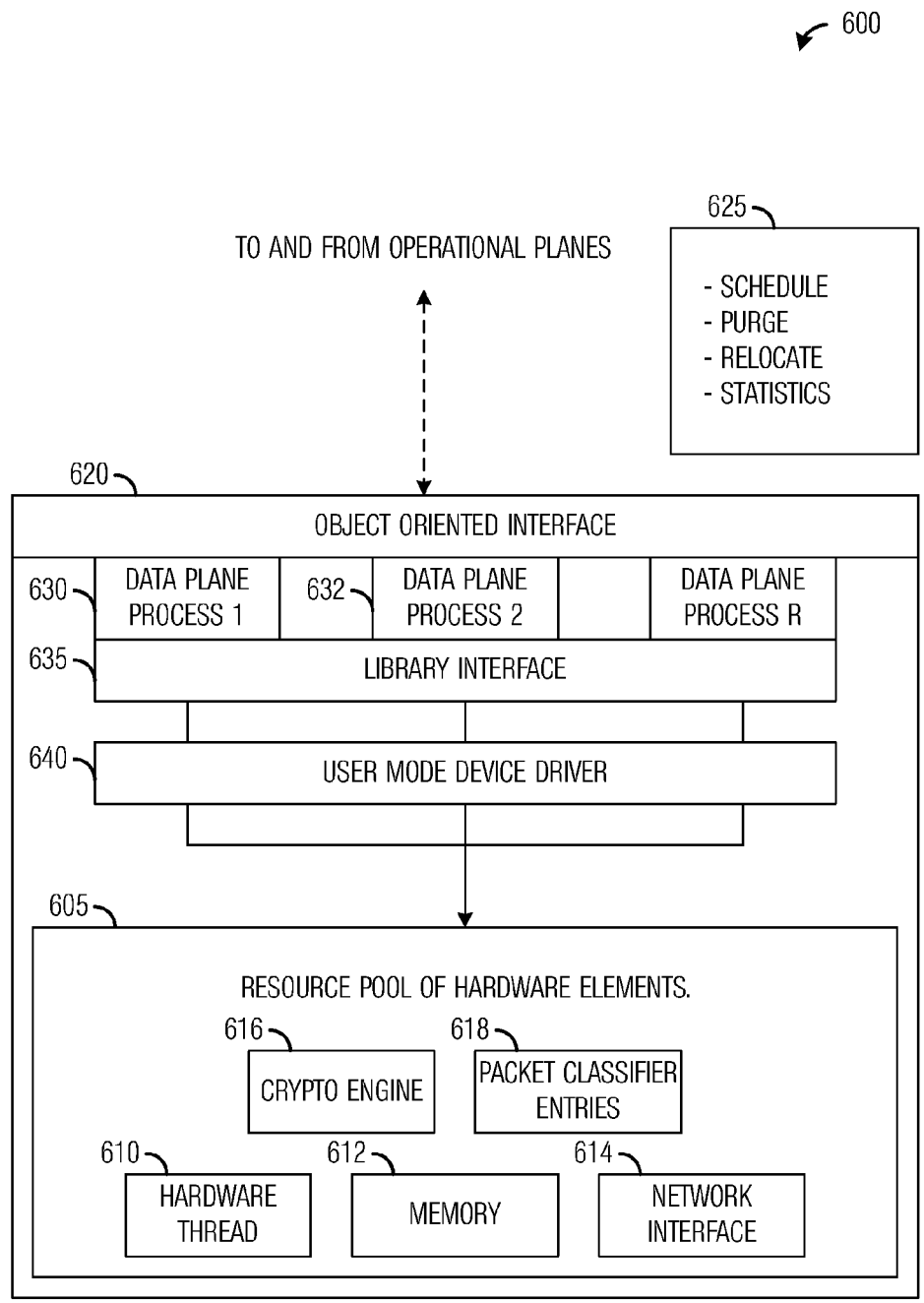
FIG. 6 illustrates an example of a data plane object according to example embodiments described herein.

FIG. 6 illustrates a data plane object 600. According to an example embodiment, data plane object 600 for a massively multi-core computing system used as a network entity may be responsible for forwarding packets on its ingress and egress path through the network entity. Data plane object 600 may be used to implement functionality such as information tunneling, queuing management, packet scheduling, and so forth.

Processing elements in a common resource pool 605 may be allocated to data plane object 600 for use in a data plane of the massively multi-core computing system. Examples of processing elements in common resource pool 605 include, but are not limited to: hardware thread 610, memory 612, classifier 614, network interface 616, and crypto acceleration engine 618. According to an example embodiment, a nature of a task being performed in data plane object 600 may dictate which processing element(s) are assigned to data plane object 600.

A management plane may be able to manage data plane object 600 through an object oriented interface 620. Exemplary commands that the management plane may be able to utilize to manage data plane object 600 are shown in box 625 and may include:

Schedule—schedule a start of data plane object 600, includes a specification of processing elements assigned to data plane object 600;

Purge—end allocation of data plane object 600;

Relocate—change allocation of processing elements of an existing data plane object, useful in load balancing operations; and Statistics—obtain statistics, including usage time, idle time, load, information related to task(s) assigned to data plane object 600, as well as performance related information.

As shown in FIG. 6, data plane object 600 includes a number of data plane processes, such as data plane process 1 630, and data plane process 2 632. Data plane processes may be assigned for execution on processing elements from common resource pool 605, and may access the processing elements through a library interface 635. Library interface 635 may include interface routines, procedures, and so on, to support usage of processing elements. Examples of interface routines, procedures, and so forth, in library interface 635 may include device drivers, interface software, etc. Data plane object 600 also includes user mode device drivers 640, which may be bound to hardware threads assigned to process ingress and egress information traffic.

Figure 7:
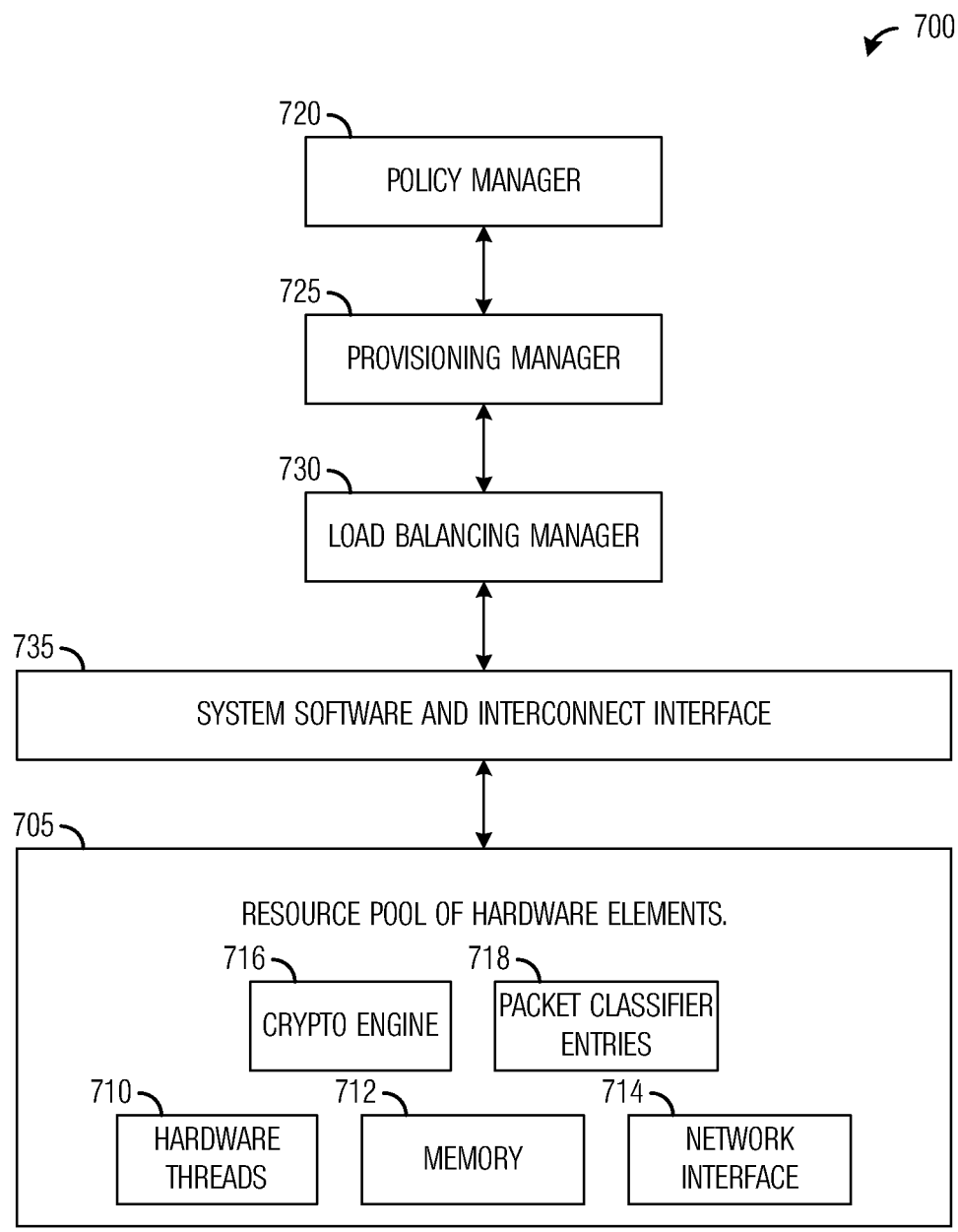
FIG. 7 illustrates an example of a management plane object according to example embodiments described herein.

FIG. 7 illustrates a management plane object 700. According to an example embodiment, management plane object 700 for a massively multi-core computing system used as a network entity comprises a variety of managers and/or processes that may be responsible for services such as:

Provisioning of control plane objects and data plane objects to adjust an operating point of the massively multi-core computing system. Also schedules control plane objects and/or data plane objects;

Load balancing of workload of the massively multi-core computing system by collecting statistics from current control plane objects and/or data plane objects to determine an overall load on the massively multi-core computing system. The statistics are collected through communications with control plane objects and/or data plane objects;

Managing policy by defining a set of guiding rules which enable a manager or process responsible for provisioning to make decisions, such as, when and where, regarding control plane objects and/or data plane objects can be scheduled. Manager or process responsible for policy management may be guided by operator and/or user input;

Maintaining overall stability of the massively multi-core computing system;

Servicing asynchronous notifications, such as link failures, port failures, power failures, device failures, and so on;

Determining traffic class of service (COS) on egress;

Supporting various cryptography acceleration policies; and

Logging and/or tracing, as well as statistics reporting.

The managers and/or processes in management plane object 700 may be allocated processing elements from a common resource pool 705. Examples of processing elements in common resource pool 705 include, but are not limited to: hardware thread 710, memory 712, classifier 714, network interface 716, and crypto acceleration engine 718. According to an example embodiment, a nature of a task being performed in management plane object 700 may dictate which processing element(s) are assigned to management plane object 700.

Managers and/or processes in management plane object 700 may be responsible for one or more of the services listed above. Each manager and/or process may be considered to be an independent object and may provide the service(s) that it is responsible for to objects (such as control plane objects and/or data plane objects, as well as other management plane objects) that wish to invoke the service(s) by sending a message, for example, to the manager and/or process. The managers and/or processes may be able to communicate using an IPC mechanism.

Management plane object 700 includes a policy manager 720 that may define a set of rules that may be used by a provisioning manager 725 to make decisions as to when and/or where control plane objects and/or data plane objects can be scheduled. Provisioning manager 725 may be responsible for provisioning resources and scheduling control plane objects and/or data plane objects, i.e., allocate and de-allocate resources. Provisioning manager 725 may also be responsible for re-allocating control plane objects and/or data plane objects for the purpose of load balancing. As an example, a free or idle resource may be de-allocated by provisioning manager 725. A load balancing manager 730 may be used to collect statistics from currently provisioned (i.e., allocated) control plane objects and/or data plane objects to determine an overall load on the massively multi-core computing system. Load balancing manager 730 may also be able to communicate with control plane objects and/or data plane objects.

A system software and interconnect interface 735 may be used to allow managers and/or processes in management plane object 700 to interface with underlying hardware. As an example, system software and interconnect interface 735 may include device drivers and interface routines and programs to allow managers and/or processes to communicate with one another and control plane objects and/or data plane objects.

As with control plane objects and data plane objects, management plane objects may need to communicate with each other as well as with control plane objects and data plane objects. Management plane objects may exchange a variety of information with each other as well as extract statistical information, tracing information, and performance information, for example, from control plane objects and data plane objects. Hence, there is a need to have each management plane object be given a unique identifier to allow individual management plane objects establish communications channels with other objects (e.g., other management plane objects, control plane objects, and/or data plane objects).

According to an example embodiment, management plane objects may be allocated from processing elements of the common resource pool as part of a start up (e.g., a system boot or re-boot procedure) procedure. The processing elements may be allocated for use as management plane objects in an early stage of the start up procedure and then control may be given to various managers and/or processes in the management plane objects. The use of processing elements from the common resource pool in management plane objects may allow for the allocation and/or de-allocation of management plane objects to meet operational requirements of a massively multi-core computing system.

According to an example embodiment, management plane objects may be allocated from reserved processing elements that are dedicated for use as management plane objects. The use of reserved processing elements may allow for specific optimization of processing elements depending on service, specifying a location of the processing elements to be used as management plane objects (to help meet or beat performance requirements, such as communications latency requirements, bandwidth requirements, locality requirements, and so on), and so forth.

Normally, in actual use, there may be some intrinsic association between control plane objects and data plane objects, resulting in a need to exchange messages between the objects. Furthermore, there may be a need to forward some form of ingress data or egress data from a control plane object to a data plane object or vice versa to provide functionality. Therefore, there is a need to uniquely identify each object (management plane objects, control plane objects, and data plane objects). A control plane object may additionally need to convey tracing and other statistical information to an associated management plane object. As a result, the processing elements assigned to the operational planes may need to be addressable entities, each carrying a unique identifier. Inter-process communications (IPC) communication may make use of the unique identifiers to establish communications channels between processing elements.

However, a need for separation between control plane and data plane traffic is not just for load balancing across different processing cores. The separation is also a requirement for processing and classifying of traffic for security and/or COS purposes.

The above described embodiments of logical architectures 200, 300, and 350, as well as resource pool object 400, control plane object 500, data plane object 600, and management plane object 700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 8, 9a, and 9b—is used to indicate the desired specific use (or non-use) of such terms.

Figure 8:
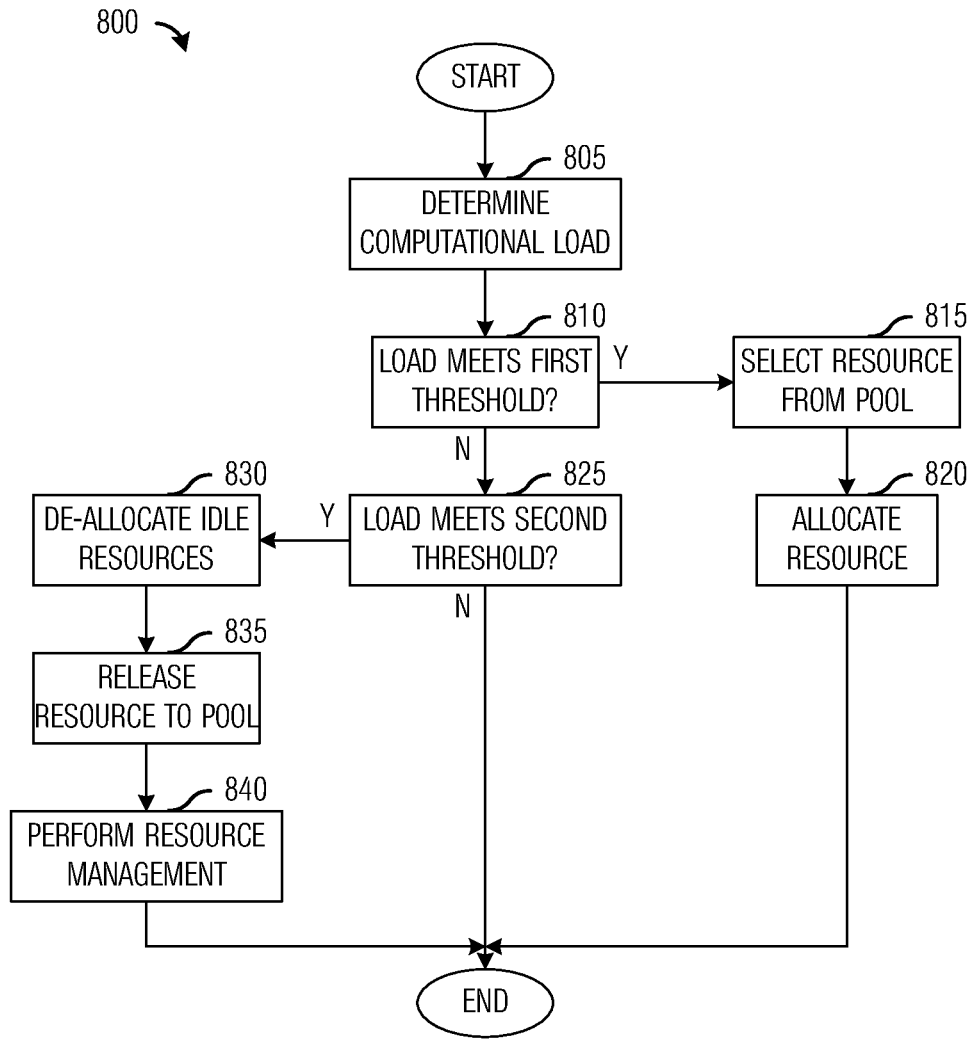
FIG. 8 illustrates an example of a flow diagram of operations in a management plane for resource allocation and/or de-allocation based on a load of a massively multi-core computing system according to example embodiments described herein.

FIG. 8 illustrates a flow diagram of operations 800 in a management plane for resource allocation and/or de-allocation based on a load of a massively multi-core computing system. Operations 800 may be indicative of operations occurring in a management plane, such as management plane 205, of a massively multi-core computing system as the management plane manages (e.g., allocates and/or de-allocates) resources based on a load of the massively multi-core computing system. Operations 800 may occur while the management plane (as well as a control plane and a data plane managed by the management plane) is in a normal operating mode.

In general, an object (and its associated resource(s)) is allocated by the management plane when there is a need for additional resources and is de-allocated by the management plane where there isn't a need for additional resources. Resources may be allocated from the common resource pool during a scheduling of an object and the resources associated with the object may be returned back to the common resource pool when the object is purged. The management plane may be responsible for exploiting the massively multi-core computing system by assigning control plane and data plane objects to available resources.

According to an example embodiment, a granularity of the scheduling may be at a coarse level. The use of coarse granularity optimizes a problem space (the allocation of resources) into two hierarchical levels: A high level wherein the problem may be cast as how to assign newly scheduled control plane objects and/or data plane objects from available resources from resource pool objects; and a low level wherein the problem may revolve around local scheduling and communications paradigms that are needed to effectively perform tasks within the control plane objects and/or the data plane objects.

Operations 800 may begin with the management plane (or a manager or process operating in the management plane) determines a load on the massively multi-core computing system (block 805). According to an example embodiment, the management plane may determine the load on the massively multi-core computing system based on performance statistics provided by the control plane and/or the data plane. Examples of performance statistics may include information such as computation load, busy time, idle time, memory access percentages, memory access stalls, network access percentages, network access times, and so forth. The performance statistics may be used to determine the load, which may be an indication of how hard resources in the massively multi-core computing system are working.

The management plane may compare the load to a first threshold to determine if the massively multi-core computing system is overloaded (block 810). The first threshold may specify, in addition a load value above which the massively multi-core computing system is overloaded, a time value that may be used to determine that the massively multi-core computing system is overloaded only if the load value is met for a duration at least as long as the time value. In addition to or in lieu of the load value and/or the time value, the first threshold may specify memory access values, network access values, and so forth, for determining if the massively multi-core computing system is overloaded.

If the management plane determines that the massively multi-core computing system (or resources therein) is overloaded, then the management plane may select a resource(s) from a common resource pool to allocate to additional control plane objects and/or data plane objects to help reduce the load of the massively multi-core computing system (block 815). If insufficient resources are available in the common resource pool, the management plane may need to wait until a later time to allocate additional resources. Alternatively, the management plane may perform resource management to bring resources formerly placed in a sleep mode or low power mode back to normal and then select the resource(s) as needed.

According to an example embodiment, the resources may be selected based on one or more selection parameters in order to help maximize an impact of the resource on the load of the massively multi-core computing system. Examples of selection parameters may include: proximity of the resource to data and/or control objects to which it is being allocated; current load on the resource if any; load on resources near the resource; network bandwidth available to and near the resource; availability of other resources in the common resource pool; and so forth.

With the resource(s) selected, the management plane may allocate the resource to the control plane object and/or the data plane object (block 820).

If the massively multi-core computing system is not overloaded, i.e., the first threshold is not met (block 810), then the management plane may compare the load to a second threshold to determine if the massively multi-core computing system is underloaded (block 825). As with the first threshold, the second threshold may specify, in addition to a load value below which the massively multi-core computing system is underloaded, a time value that may be used to determine that the massively multi-core computing system is underloaded only if the load value is met for a duration at least as long as the time value. In addition to or in lieu of the load value and/or the time value, the second threshold may specify memory access values, network access values, and so forth, for determining if the massively multi-core computing system is underloaded.

If the management plane determines that the massively multi-core computing system (or resources therein) is underloaded, then the management plane may de-allocate resource(s) currently allocated in the massively multi-core computing system (block 830). According to an example embodiment, the management plane may select resources of objects (control plane objects and/or data plane objects) that are idle for de-allocation. If there are no resources that are idle, then the management plane may perform load balancing to aggregate a number of near idle resources together so that one or more resource may be busy and one or more resources may be idle. The management plane may then select the resources for de-allocation.

The management plane may then release resources back to the common resource pool (block 835). The management plane may then perform resource management (block 840). According to an example embodiment, resource management may include placing resources that have been idle for a specified period of time into a sleep mode or a low power mode. Resource management may further include bringing resources out of sleep mode or low power mode if resources are needed.

Rather than having the management plane perform resource allocation and/or de-allocation based on a load of the massively multi-core computing system, the management plane may perform resource allocation and/or de-allocation based on requests for additional resources and requests for release of resources from the control plane and the data plane.

Figure 9A:
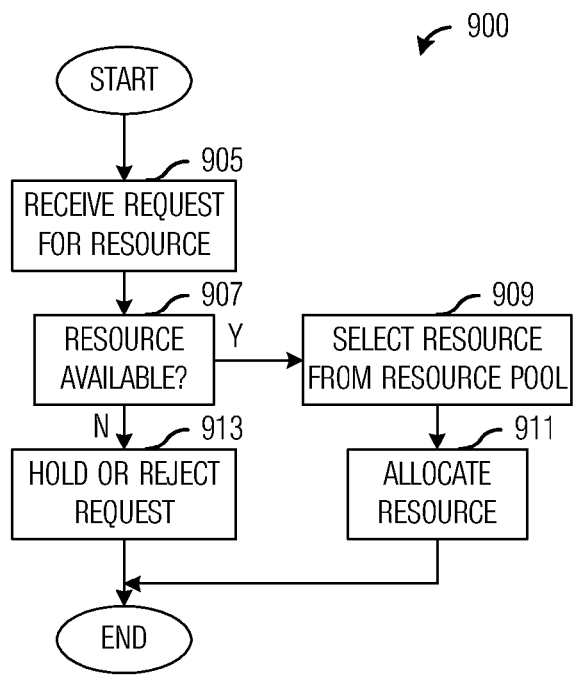
FIG. 9a illustrates an example of a flow diagram of operations in a management plane for resource allocation on a load of a massively multi-core computing system based on requests according to example embodiments described herein.

FIG. 9a illustrates a flow diagram of operations 900 in a management plane for resource allocation on a load of a massively multi-core computing system based on requests. Operations 900 may be indicative of operations occurring in a management plane, such as management plane 205, of a massively multi-core computing system as the management plane manages (e.g., allocates) resources based on requests. Operations 900 may occur while the management plane (as well as a control plane and a data plane managed by the management plane) is in a normal operating mode.

Operations 900 may begin with the management plane (or a manager or process operating in the management plane) receiving a request for an additional resource(s) from a control plane and/or a data plane (block 905). The control plane and/or the data plane may be making the request due to its determination that it has met a criterion for being overloaded.

The management plane may perform a check to determine if there are sufficient resources in a common resource pool to meet the request (block 907). In order to meet the resource request, the management plane may need to perform resource management, which may include moving existing resource allocations, aggregating existing resource allocations, and so on.

If the resource(s) are available, the management plane may select the resource(s) from the common resource pool (block 909) and allocate the selected resource(s) to the control plane and/or the data plane (block 911).

If the resources are not available (block 907), then the management plane may elect to either hold or reject the request (block 913).

Figure 9B:
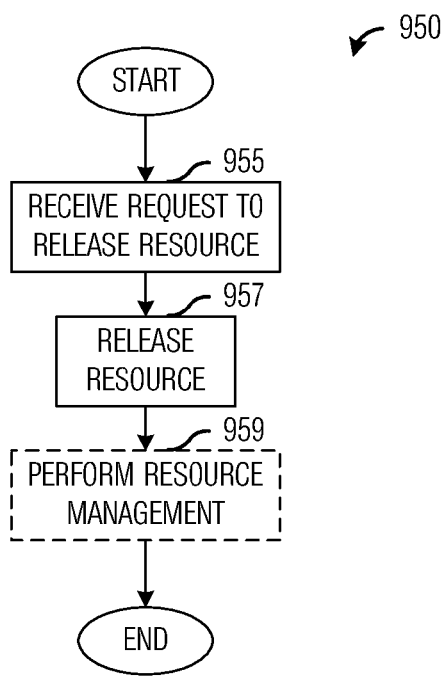
FIG. 9b illustrates an example of a flow diagram of operations in a management plane for resource de-allocation on a load of a massively multi-core computing system based on requests according to example embodiments described herein.

FIG. 9b illustrates a flow diagram of operations 950 in a management plane for resource de-allocation on a load of a massively multi-core computing system based on requests. Operations 950 may be indicative of operations occurring in a management plane, such as management plane 205, of a massively multi-core computing system as the management plane manages (e.g., de-allocates) resources based on requests. Operations 950 may occur while the management plane (as well as a control plane and a data plane managed by the management plane) is in a normal operating mode.

Operations 950 may begin with the management plane (or a manager or process operating in the management plane) receiving a request to release a resource(s) from a control plane and/or data plane (block 955). The management plane may then release the resource(s) per the request to a common resource pool (block 957).

The management plane may optionally perform resource management on the resources in the common resource pool (block 959). According to an example embodiment, resource management may include placing resource(s) that have been idle for a specified amount of time into a sleep mode or a low power mode; as well as changing resource allocations to optimize resource utilization, minimize communications overhead, or so on.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for computer management, the method comprising:
    determining, by a symmetric multi-core processing (SMP) management plane, if there is a need to allocate at least one first resource to a first plane;
    when there is a need to allocate the at least one first resource,
    selecting, by the SMP management plane, the at least one first resource from a common resource pool based on a set of load balancing rules, and
    allocating, by the SMP management plane, the at least one resource to the first plane; and
    when there is not a need to allocate the at least one first resource,
    determining, by the SMP management plane, if there is a need to de-allocate at least one second resource from a second plane, and
    when there is a need to de-allocate the at least one second resource, de-allocating, by the SMP management plane, the at least one second resource from the second plane and to the common resource pool,
    wherein the first plane comprises an SMP control plane, an SMP data plane, or a combination thereof,
    wherein the second plane comprises the SMP control plane, the SMP data plane, or a combination thereof,
    wherein the de-allocated resources from the common resource pool are allocated as SMP control plane objects or SMP data plane objects to the first and second planes, or SMP management plane objects to the SMP management plane, and wherein each of the SMP control plane objects, SMP data plane objects and SMP management plane objects have their own unique identifier,
    wherein the first plane, second plane and SMP management plane each execute on a separate management resource or a separate set of management resources, and
    wherein the SMP management plane leaves resources of the first and second planes unchanged when there is not a need to allocate at least one first resource and when there is not a need to de-allocate at least one second resource.

2. The method of claim 1, wherein determining if there is a need to allocate at least one first resource comprises:
    determining a first load on a computer;
    determining that there is a need to allocate the at least one first resource if the first load meets a first threshold; and
    determining that there is not a need to allocate the at least one first resource if the first load does not meet the first threshold.

3. The method of claim 2, wherein determining a first load comprises:
    receiving performance statistics from allocated resources in the computer; and
    computing the first load from the performance statistics.

4. The method of claim 3, wherein the performance statistics comprises computation load, busy time, idle time, memory access percentages, memory access stalls, network access percentages, or network access times, or combinations thereof.

5. The method of claim 2, wherein the first threshold comprises an overload value.

6. The method of claim 5, wherein the first threshold further comprises an overload time value.

7. The method of claim 1, wherein determining if there is a need to de-allocate at least one second resource comprises:
    determining a second load on a computer;
    determining that there is a need to de-allocate the at least one second resource if the second load meets a second threshold; and
    determining that there is not a need to de-allocate the at least one second resource if the second load does not meet the second threshold.

8. The method of claim 7, wherein the second threshold comprises an underload value.

9. The method of claim 8, wherein the second threshold further comprises an underload time value.

10. The method of claim 1, wherein determining if there is a need to allocate at least one first resource comprises receiving a first message from the first plane, wherein the first message comprises a request for the allocation of the at least one first resource.

11. The method of claim 1, wherein determining if there is a need to de-allocate at least one second resource comprises receiving a second message from the second plane, wherein the second message comprises a request for the de-allocation of the at least one second resource.

12. A computing system comprising:
- a data plane configured to move data, the data plane having a first object-oriented interface;
- a control plane coupled to the data plane, the control plane having a second object-oriented interface, the control plane configured to execute applications to manipulate data in the data plane;
- a common resource pool coupled to the data plane and to the control plane, the common resource pool having a third object-oriented interface, the data plane and control plane configured to interact with the common resource pool via their respective object-oriented interfaces, and the common resource pool configured to contain unallocated resources of the computing system; and
- a management plane coupled to the data plane and to the control plane, the management plane having a fourth object-oriented interface, the management plane configured to communicate with the common resource pool via their respective object-oriented interfaces, and the management plane configured to allocate resources from the common resource pool to the data plane or the control plane, to de-allocate resources from the data plane or the control plane to the common resource pool, wherein the allocation and the de-allocation are based on load balancing rules, wherein the unallocated resources from the common resource pool are allocated as data plane objects to the data plane, control plane objects to the control plane, or management plane objects to the management plane, wherein each of the data plane objects, control plane objects and management plane objects have their own unique identifier, and wherein the data plane, control plane and management plane each execute on a separate management resource or a separate set of management resources.

13. The computing system of claim 12, wherein the management plane comprises:
- a provisioning manager configured to allocate and de-allocate resources;
- a policy manager coupled to the provisioning manager, the policy manager configured to define a set of load balancing rules to guide the provisioning manager; and
- a load balance manager coupled to the provisioning manager, the load balance manager configured to determine a load on the computing system based on information from allocated resources.

14. The computing system of claim 13, wherein the provisioning manager is further configured to re-allocate resources to balance a load of the computing system.

15. The computing system of claim 12, wherein the computing system comprises a multi-core computing system.

16. The computing system of claim 15, wherein the computing system is used as a network entity in a communications network.

17. A management plane of a computing system comprising:
- a plurality of storage memories;
- a plurality of processors respectively coupled to the plurality of storage memories, wherein the plurality of processors is configured to execute:
- a first object-oriented interface coupled to a second object-oriented interface of a common resource pool;
- a load balance unit coupled to the first object-oriented interface, the load balance unit configured to determine a load of the computing system;
- a provisioning unit coupled to the load balance unit, the provisioning unit configured to select at least one first resource for a first plane and at least one second resource for a second plane based on the respective loads of each plane and a set of load balancing rules, and to allocate the at least one first resource to the first plane and the at least one second resource to the second plane based on the respective loads of each plane, wherein the at least one first and second resources are selected from the common resource pool, wherein the first plane comprises a control plane, a data plane, or a combination thereof, wherein the second plane comprises the control plane, the data plane, or a combination thereof, wherein the resources from the common resource pool are allocated as control plane or data plane objects to the first plane and second plane, or management plane objects to the management plane, wherein each of the control plane objects, data plane objects and management plane objects have their own unique identifier, and wherein the first plane, second plane and management plane each execute on a separate management resource or a separate set of management resources; and
- a policy unit coupled to the provisioning unit, the policy unit configured to define the set of load balancing rules.

18. The management plane of claim 17, wherein the load balance unit is configured to retrieve performance statistics from currently allocated resources and to compute the load from the performance statistics.

19. The management plane of claim 18, wherein the performance statistics comprises computation load, busy time, idle time, memory access percentages, memory access stalls, network access percentages, or network access times, or combinations thereof.

20. The management plane of claim 17, wherein the provisioning unit is configured to select the at least one resource if the load meets a first threshold.

21. The management plane of claim 20, wherein the first threshold comprises a first load value, a first time value, or a combination thereof.

22. The management plane of claim 17, wherein the provisioning unit is further configured to de-allocate at least one free resource if the load meets a second threshold.

23. The management plane of claim 22, wherein the second threshold comprises a second load value, a second time value, or a combination thereof.

* * * * *